May 19, 1942.  O. J. SUNDSTRAND  2,283,401
POWER DRIVEN CARRIAGE RETURN MECHANISM
Filed June 22, 1937       5 Sheets-Sheet 1

INVENTOR
OSCAR J. SUNDSTRAND
BY
ATTORNEY

May 19, 1942.  O. J. SUNDSTRAND  2,283,401
POWER DRIVEN CARRIAGE RETURN MECHANISM
Filed June 22, 1937    5 Sheets-Sheet 2
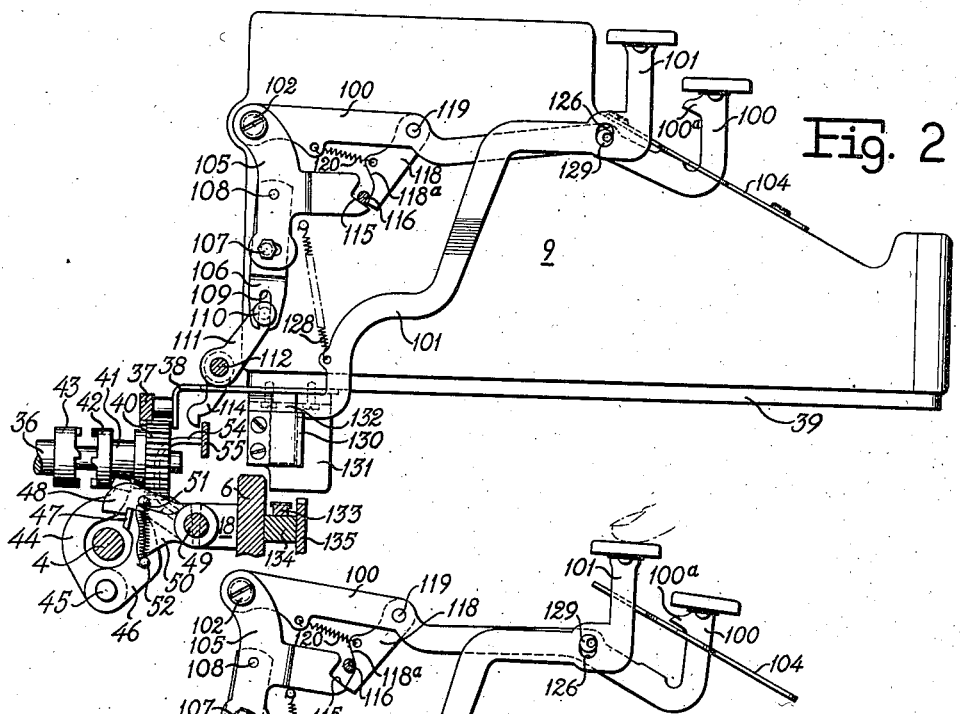
Fig. 2
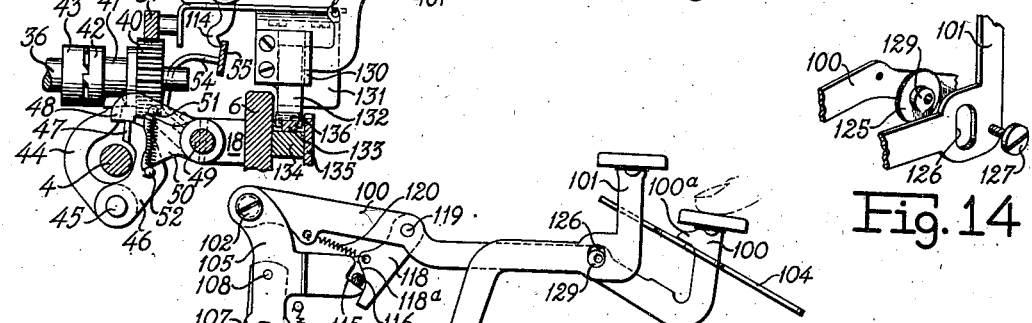
Fig. 3
Fig. 14
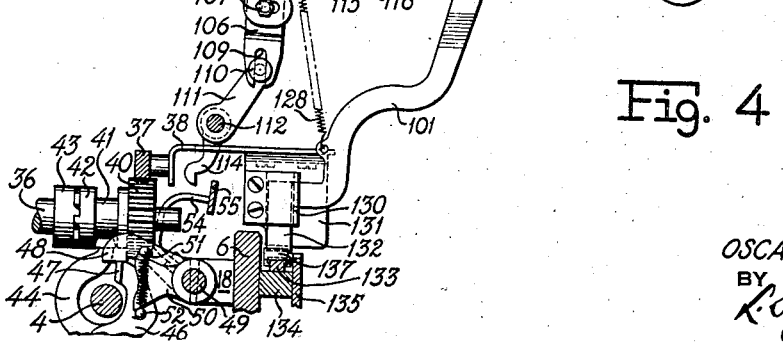
Fig. 4
INVENTOR
OSCAR J. SUNDSTRAND
BY
ATTORNEY May 19, 1942. O. J. SUNDSTRAND 2,283,401
POWER DRIVEN CARRIAGE RETURN MECHANISM
Filed June 22, 1937 5 Sheets-Sheet 3

INVENTOR
OSCAR J. SUNDSTRAND
BY
ATTORNEY

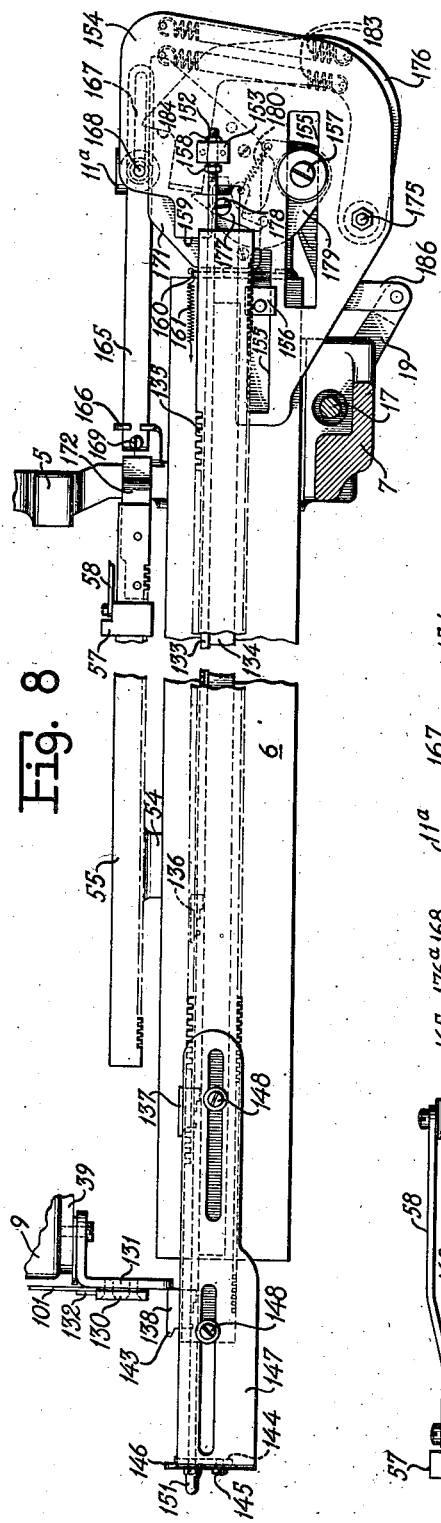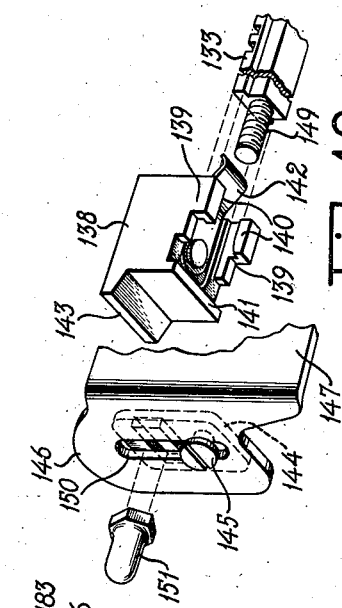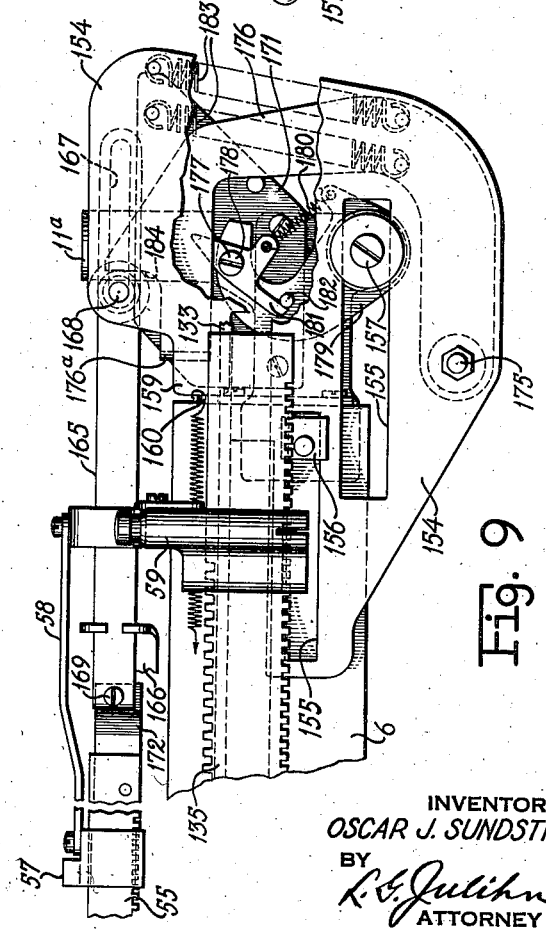

May 19, 1942.    O. J. SUNDSTRAND    2,283,401
POWER DRIVEN CARRIAGE RETURN MECHANISM
Filed June 22, 1937    5 Sheets-Sheet 5

INVENTOR
OSCAR J. SUNDSTRAND
BY
ATTORNEY

Patented May 19, 1942

2,283,401

UNITED STATES PATENT OFFICE 2,283,401

POWER DRIVEN CARRIAGE RETURN MECHANISM

Oscar J. Sundstrand, Bridgeport, Conn., assignor to Underwood Elliott Fisher Company, New York, N. Y., a corporation of Delaware Application June 22, 1937, Serial No. 149,571

26 Claims. (Cl. 197—66)

This invention relates more particularly to motor-driven means to return a travelling carriage from any of its advanced positions, and to arrest the carriage selectively at any one of two or more predetermined points on such return.

One object of the invention is to improve and simplify the means heretofore used for this purpose, as well as to produce an inexpensive device adapted for application with a minimum of labor to machines already built and in use, and one which can not readily become out of order.

Another object is to effect automatic line spacing incidental to the return of the carriage, in a novel manner, irrespective of the selected point of arrest of the carriage on its return travel.

Still another object is to provide a novel control, whereby to select the point to which the carriage shall return under the power of a motor.

Another object is to provide novel means to cushion the application of power to the line spacing mechanism, which line spacing is effected incident to the return of the carriage.

A further object resides in the provision of a uniform braking action to prevent accidental movement of the carriage relatively to its support, which braking action shall be effective at any selected point in the return travel of the carriage.

Yet another object is to effect an automatic braking action on the line space carriage as it completes its line spacing travel on the return of the carriage to its left hand marginal position, which braking action is automatically released prior to an operation of the machine.

Another object is to effect a braking action as referred to in the preceding paragraph, upon the return of the carriage part way towards its left hand marginal position.

A further object is the provision of a single stop on the carriage adapted to co-act with suitably spaced stops for arresting the carriage in any of a plurality of positions to which it may be returned from an advanced position.

Still another object is to enable the carriage to pick up its co-acting arresting means at various points on its return from an advanced position, the carriage being arrested in any selected precedent position by a single stop means effective for any selected precedent position to which it is desired that the carriage shall return.

Another object is to provide means to arrest the carriage on its automatic return, at various points, which means may be adjustably positioned on a suitable support to remain in their effective positions, irrespective of the selected point at which the carriage is to be arrested.

In carrying out this last object, the stops which arrest the carriage at various points on its return, are of various heights and are adjusted along a bar parallel with the path of travel of the carriage, the stops remaining where adjusted and the carriage passing such positioned stops as lie in its path of return to the selected stop.

In the Elliott-Fisher machine, the automatic return of the carriage to the left hand marginal stop results in the automatic line spacing of the carriage, accompanied by a braking action of the line spacing mechanism to prevent accidental overthrow or displacement of the carriage in relation to the new line.

A further object of this invention is to arrange that the carriage return mechanism may function to return the carriage fully to its left hand marginal stop, or at will, to return the carriage to various points short of such full return, while retaining the automatic line spacing and carriage-braking functions.

To these and other ends, the invention includes certain novel features and combinations of parts, all of which will be more fully explained hereinafter, and particularly pointed out in the claims.

In the accompanying drawings:

Fig. 2 is a detail side view of the manually operable keys, operation of which initiates the return of the carriage, and selection and continued depression of which determines the extent of return of the carriage, the keys being shown in their normal positions;

Fig. 3 is a side view taken at the moment when, in the depression of one of the carriage return keys, the carriage return clutch has been closed, the key being just about to release its control thereof;

Fig. 4 is a similar view, showing the positions of the parts upon complete depression of another of the carriage return control keys, the carriage stop being positioned to collide with that co-acting stop on the line space draw bar nearest the left hand margin stop;

Fig. 8 is a view similar to Fig. 5, but showing the line spacing slide in its partially operated position, just about to release the line spacing mechanism after the operation thereof;

Fig. 9 is an enlarged fragmentary view in front elevation partly broken away, of the right hand end of the line spacing slide, the parts occupying the positions assumed at the completion of the leftward travel of the slide, at the arrest of the carriage on any of its return excursions;

Fig. 10 is a disassembled perspective view of one of the stops adjustable along the line space draw rod, said rod and certain associated parts;

Fig. 14 is an enlarged perspective detail view illustrating mechanism for effecting an adjustment of the connections between the two partial carriage return keys.

Figure 1:
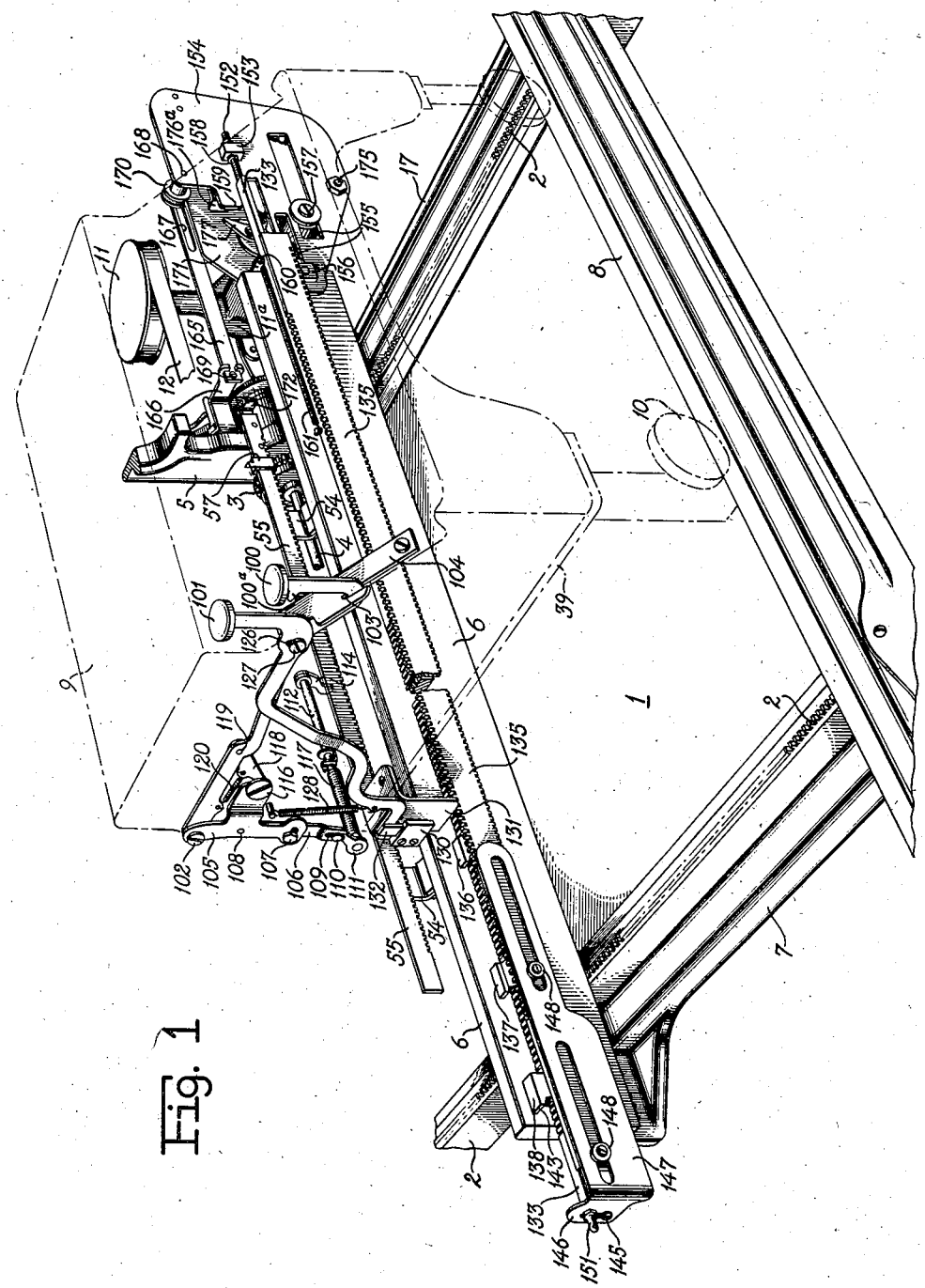
Fig. 1 is a perspective view of one form of the invention, applied to the well-known Elliott-Fisher flatbed typewriting machine, parts being omitted for the sake of clearness.

Referring to the drawings, a flat platen 1, (Fig. 1), is mounted between a pair of parallel side bars 2 suitably supported on a standard, not shown.

A portion of each bar is toothed to form a rack engageable by traction gears 3 (Fig. 11), fast on a shaft 4 extending transversely of the rails and supported by bearings in vertical brackets 5 projecting upwardly from the rear corners of a rectangular line space frame 7, the front rail 8 (Fig. 1), of which is likewise supported by wheels, not shown, in rolling contact with the side bars 2, to enable the line spacing frame to move forwardly and rearwardly.

The front and rear cross rails 6 and 8 support a key carriage 9, shown in dot-and-dash outline in Fig. 1, for travel across the platen 1, in letter spacing direction and return, on front and rear wheels, of which the front wheels 10 only are indicated.

The key carriage contains the customary key actions, ribbon mechanism and controls for the carriage escapement, not necessary to illustrate, but disclosed in U. S. patent to Foothorap, No. 1,203,519, issued October 31, 1916. The usual spring barrel 11 is mounted on the line space frame 7, a tape 12 connecting the spring barrel with the key carriage 9 to draw the key carriage towards the right in letter spacing direction under control of the escapement mechanism.

Figure 7:
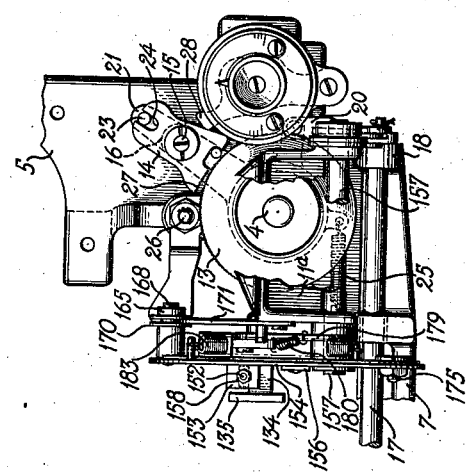
Fig. 7 is a fragmentary detail view of the line spacing mechanism, looking from the right hand side of the line space frame.

Line spacing mechanism is provided, including a knurled ratchet 13 (Fig. 7), fast on the projecting right hand end of the cross shaft 4 and actuated step by step by a pawl 14 pivoted at 15 on a pawl carrier 16 journaled on the projecting end of the cross shaft 4, all as shown in U. S. patent to Foothorap No. 1,914,884, issued June 20, 1933.

A manually operable line spacing shaft 17 is journaled in lugs 18 along one side of the line space frame 7 (one lug only being shown), the shaft extending from front to rear of the line space frame, and having a handle (not shown) at its front end. At its rear end, the shaft 17 is connected by an arm 19 and link 20 to one arm of a bell crank 21 journaled on the projecting right hand end of the cross shaft 4 adjacent the pawl carrier 16. The remaining arm of the bell crank carries a lateral stud 23 entered in a notch 24 in the tail of the line space pawl 14. Springs 25 anchored at their forward ends to the line space frame, and connected at their rear ends to the hub of the pawl carrier 16, yieldingly retain the pawl carrier and bell crank 21, with the pawl 14, in retracted positions, wherein the pawl is disengaged from its ratchet 13.

Figure 6:
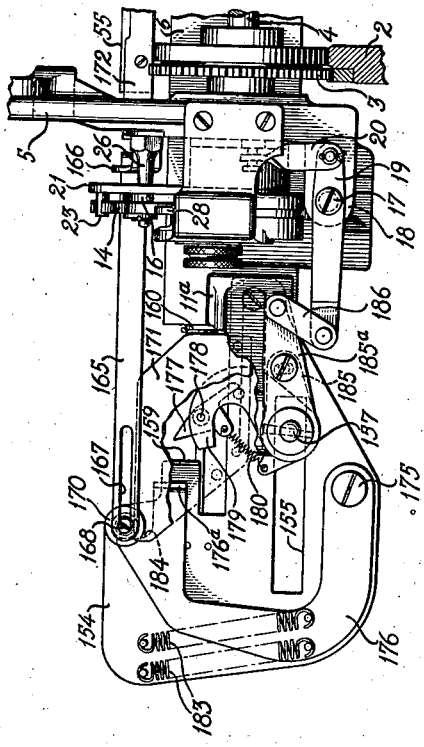
Fig. 6 is a fragmentary rear view of the right hand end of the line spacing slide assembly, showing the line spacing feed mechanism.

Operation of the line spacing shaft 17 in counter-clockwise direction (Fig. 6) rocks the bell crank 21, the pawl carrier 16 and its pawl 14 counterclockwise (Fig. 7) against the tension of restoring springs 25, (see Foothorap, 1,719,176, July 2, 1929), the bell crank first causing the normally inactive pawl to engage its knurled line spacing ratchet 13, and then rotate the latter with the thereto-connected cross shaft 4 and traction gear wheels 3. Rotation of the toothed traction wheels in engagement with the racks on the side bars 2 of the supporting frame, advances the line space frame 7 and its superposed key carriage 9 to locate the line space frame and key carriage in position to print on the succeeding line on a work sheet on the underlying flat platen 1.

A stud 26 projecting from the bracket 5 into the path of the line spacing pawl 14, arrests the pawl at the completion of a line spacing operation, contact of the pawl with its arresting stud 26 operating also to rock the pawl to cause its kurled foot 27 to wedge itself between the stud and the periphery of the knurled line space ratchet 13 to act as a brake which prevents overthrow of the line space frame 7 and key carriage 9 past the desired line to which it has been advanced, which overthrow might be caused by inertia of the operated parts, or jarring of the machine.

Release of the manually operated line spacing handle enables the restoring springs 25 to return the bell-crank 21, pawl carrier 16 and pawl 14 to their initial positions, wherein the pawl is arrested by contact with an adjustable backstop 28, as disclosed in U. S. patent to Foothorap, 1,914,884, issued June 20, 1933, to which, and to patents to Foothorap, 1,861,216, May 31, 1932 and 1,904,127, issued April 18, 1933, reference may be made for a more complete explanation of the line spacing mechanism.

*Power drive*

The key carriage 9 may be manually returned to the left hard margin, from any point to which it has been advanced in letter spacing direction, but to relieve the operator of the work of returning the carriage, a motor 30 (Fig. 11), is provided, conveniently mounted on a casting (not shown), secured to and projecting rearwardly from the rear rail 6 of the line space frame 7, with which it travels, as shown in Foothorap, 1,904,127, April 18, 1933, above mentioned.

Figures 11, 12, 13:
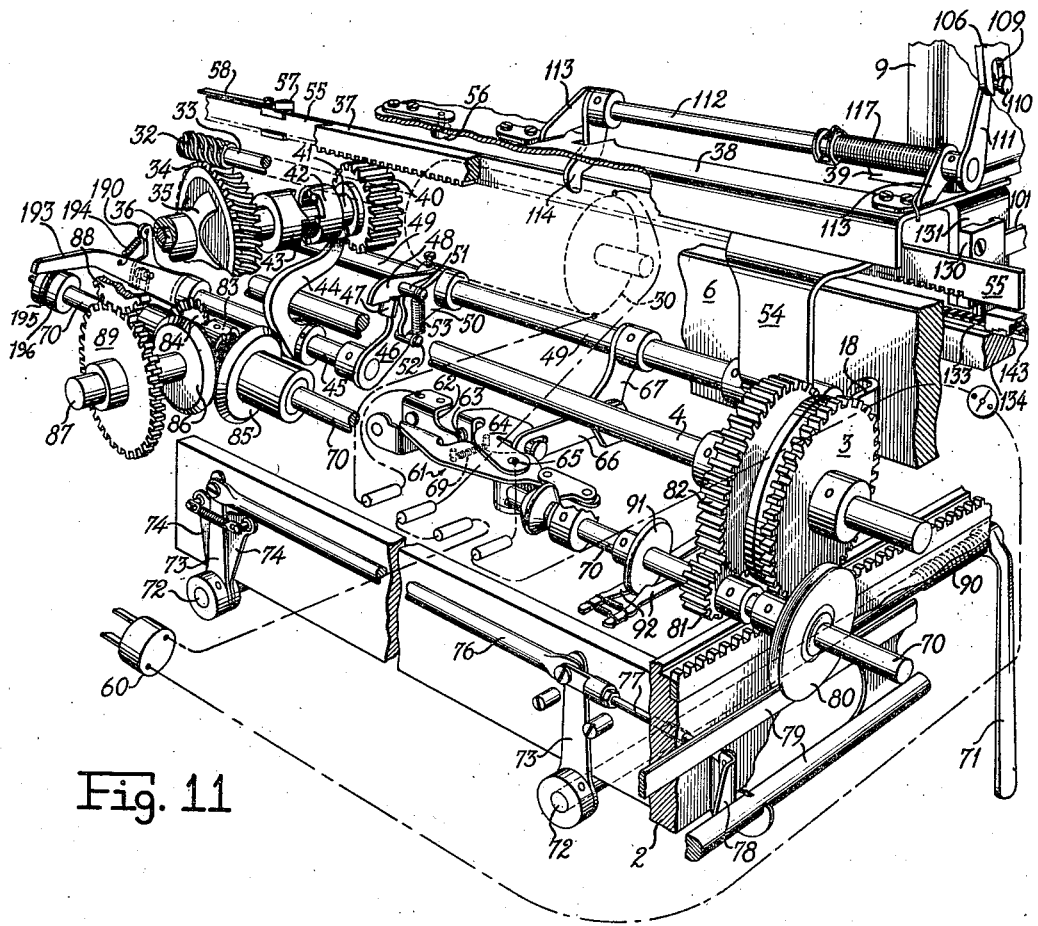
Fig. 11 is a rear perspective view of the motor and its connections to return the carriage towards the left hand margin, and to traverse the carriage, towards and from the operator, parts being omitted and broken away for clarity of illustration.
Fig. 12 is a detail side view of an interlock between the carriage return, and carriage traversing mechanisms, the interlock shown effective to prevent operation of the traversing mechanism during return of the carriage towards the left hand margin.
Fig. 13 is a view similar to Fig. 12 showing the interlock still effective to prevent premature operation of the carriage-traversing mechanism, notwithstanding the release of the carriage return clutch mechanism.

Referring to Fig. 11 of the drawings of the instant case, power from the motor is taken from the worm 32 fast on the motor shaft 33 and meshing with a worm gear 34 having a friction clutch connection 35 with a countershaft 36 journaled in the casting, and extending forwardly beneath a carriage return rack 37 secured to the flanged rear end of an apron 38 projecting from the deck 39 of the key carriage 9.

A wide, carriage return pinion 40 journaled on the forward end of the counter-shaft 36 and axially movable along the shaft, meshes with the teeth of the carriage return rack 37 at all times, the return pinion having a peripherally grooved collar 41 terminating at its rear end in a driven clutch member 42 normally disengaged from a driving clutch member 43 fast on the countershaft.

The free end of a clutch shift finger 44 lies in the groove in the sliding, rotatable collar 41, the finger being curved to avoid contact with the cross shaft 4 and being fast between the ends of a clutch shifting shaft 45 journaled in the motor support casting. A clutch shifting arm 46 fast on one end of the clutch shifting shaft 45, is provided with a lateral locking lip 47 normally engaged by a hooked latch 48 journaled on a trip shaft 49 extending across the machine and supported in bearings 18 projecting from the back of the rear rail 6. A fan-shaped trip arm 50 fast on the trip shaft 49 extends rearwardly between two studs 51 and 52 projecting, respectively, from the hooked latch 48 and from the clutch shifting arm 46, a normally tensioned spring 53 connecting the two studs to form a yielding link therebetween, and normally maintaining the hooked latch 48 engaged with the clutch shifting arm 46 to retain the clutch members 42, 43 disengaged.

*Control of automatic carriage return mechanism*

Standards 54 project upwardly from the trip shaft 49 and may be forwardly extended at their upper ends to support a tripping bail 55 conveniently toothed, as shown, at its opposite ends and rocking with the shaft 49. In the structure disclosed in Foothorap Patent 1,904,127, on which the present invention is an improvement, there is provided a pair of oppositely faced cam blocks adjustably mounted on the opposite toothed ends of the universal tripping bail for operation respectively by relatively offset tappets depending from the body portion of the carriage apron.

The present invention dispenses with the right hand cam block and its co-acting tappet (looking from the rear), and these elements are not illustrated, but the following description in its application to the mechanism shown in Patent 1,904,127, will refer to these eliminated parts.

In the normal positions of the parts, the hooked latch 48, normally engaged with the lip 47 of the clutch shifting arm 46, retains the trip shaft 49 and its tripping bail 55 in their rearmost positions. As the carriage 9, travelling in letter-spacing directions advances the printing point towards the extreme right hand margin of the work sheet, a tappet roll 56 located near the left hand end of the carriage, viewed from the rear of the machine (Fig. 11), and depending from the apron 38, wipes across the inclined face of a cam block 57 adjustably located on the left hand end of the universal tripping bail 55, and rocks the bail forwardly, thereby rotating the trip shaft 49 in clockwise direction (viewed from the left).

The cam block 57 is slidably mounted on the trip bail 55, and is pivotally connected by a link 58 (Fig. 9), with the right hand marginal stop 59 adjustable along and releasably engaging the right hand end of the carriage escapement rack 135.

The rearwardly projecting trip arm 50 fast on the trip shaft, rocks therewith to disengage the hooked latch 48 from the clutch-shifting arm 46, and in so doing, additionally tensions the spring 53, which spring, acting as a tension link, rocks the clutch shifting shaft 45 and its clutch shifting finger 44 counter-clockwise, to slide the driven member 42 of the clutch 42, 43 along the countershaft 36 into engagement with its drive member 43, the carriage return pinion 40 being of sufficient width to maintain its engagement with the carriage return rack 37 throughout the clutch shifting action.

The motor 30, if of the constantly running type, will then drive the carriage in contra-letter spacing direction, towards the left hand margin, but, as shown in Patent 1,904,127, heretofore referred to, the motor is of the intermittent type, and the motor circuit is normally interrupted. Therefore, the patent provides means to control the motor circuit as follows.

The normally open circuit for the motor, includes a source of power 60, and a switch 61, the latter comprising a stationary contact mounted on a bracket 62 and a movable contact 63.

The movable contact 63 is conveniently mounted on a swinging switch arm 64 pivoted at 65, and connected by a slotted link 66 with a depending switch-controlling arm 67 fast on the trip shaft 49, the switch arm 64 with its contact being normally held apart from the stationary contact 62 by the clutch-engaging spring 53.

When the carriage tappet 56 rocks the tripping bail 55 and its trip shaft 49 forwardly in clockwise direction (Figs. 2-4), the switch-controlling arm 67 fast on the trip shaft will force the slotted link 66 rearwardly to enable a spring 69 (inferior to spring 53) to rock the switch arm 64 and engage its contact 63 with the stationary contact 62, thereby closing a circuit through the motor to transmit power thereto.

Where a continuous motor is employed, the switch mechanism and its control is omitted.

In Patent 1,904,127, the carriage, upon its return to its left hand marginal position, under the influence of the motor, causes its right hand tappet roll (looking from the rear of the machine) to wipe against a cam-faced block adjustably mounted on the tripping bail.

The present machine is provided with the improved mechanism hereinafter described for rocking the tripping bail 55 back to its normal position. During this operation of the tripping bail, the tripping arm 50 is pressed against the stud 52 on the clutch shifting arm 46 and rocks the arm, together with the clutch shaft 45 and clutch finger 44 in clockwise direction, (Fig. 11) to cause the finger to disengage the driven clutch member 42 from the drive clutch member 43, thereby disconnecting the motor 30 from the travelling carriage 9.

The spring 53 draws the hooked latch 48 downwardly, as the clutch shifting arm 46 is rocked clockwise, until the latch snaps over the lip 47 on the free end of the clutch shifting arm, to lock the clutch shift mechanism, and hence the clutch members, in disengaged positions.

Coincidentally, the switch control arm 67 on the trip shaft 49, through the link 66, swings the switch arm 64 and its contact 63 away from the stationary contact on the member 62, to interrupt the motor circuit, the spring 53 maintaining the movable switch contact out of engagement with its stationary contact.

The invention forming the subject of the instant specification initiates the disconnection of the clutch members and the making and breaking of the switch contacts in a different manner to be hereinafter explained.

It is customary in Elliott-Fisher machines, as disclosed in Foothorap, 1,904,127, to provide means for advancing or retracting the line spacing frame 7 and the key carriage 9 superposed thereon, relatively to the platen 1 through a distance of several line spaces, under motor power.

The control for this function of the machine includes an axially shiftable shaft 70 (Fig. 11), journaled at its opposite ends in one of the rear brackets 5 (Fig. 1), and in the motor supporting casting (not shown), respectively.

Operation of either of two knee levers 71, Fig. 11, (one only of which is shown), fast on their respective shafts 72 journaled in the main frame of the machine and running from front to rear thereof, rocks its shaft 72 and with it an arm 73 fast on the shaft near its rear end, one of which arms is embraced between spring-pressed centering members 74, 74 loose on the shaft 72 and tending to maintain the shaft at an intermediate point between its limits of travel, by embracing a stud (not shown) fixed on the frame. A link 76 connects the two arms 73, a second link 77 connecting one of the arms 73 with an ear 78 connected to a bail 79 pivoted on the main frame, the bail forming a rail along which rolls a grooved wheel 80 fast on the axially shiftable control shaft 70. A wide pinion 81 fast on the control shaft 70 is in constant mesh with a wide, toothed gear 82 fast on the traction wheel shaft 4, and a double-faced clutch member 83 fast on the control shaft 70 near its inner end, engages one or another of two co-acting opposed clutch members (not shown), fast to their respective opposed beveled gears 84, 85 loose on the control shaft 70 and in constant mesh with a crown gear 86 fast on a jack shaft 87 journaled in the motor casting assembly parallel with and below the countershaft 36. A gear 88 also fast on the countershaft 36, meshes with a gear 89 fast on the jack shaft 87 to transmit rotation thereto from the motor.

The knee lever 71, when rocked in one direction or the other, shifts the control shaft 70 axially to engage one or another face of the double clutch 83 with the proper co-acting clutch member (not shown) on beveled gear 84 or 85, to enable the motor to drive the traction shaft 4 and traction gears 3 in one direction or the other, and advance or withdraw the line space frame 7 and key carriage 9 relatively to the operator seated in front of the machine.

A circuit through the motor 30 is also controlled by the axially shiftable shaft 70, as shown in Patent 1,904,127, and not necessary to describe in detail herein.

Upon relieving pressure against the knee lever 71, springs 90 encircling the knee lever shafts 72 co-act with the spring-connected centering arms 74 to return the parts, including the control shaft 70, to normal position, thereby restoring the clutch 83 to its neutral position between the beveled gears 84, 85 to discontinue transmission of power from the motor to the traction gears 3, and to interrupt the motor circuit controlled by the axially shiftable shaft 70.

To center the control shaft 70 when the line space frame and key carriage have been disconnected from the platen frame, a disk 91 fast on the control shaft is snugly embraced between the free ends of rearwardly extending, spring-connected arms 92 pivoted to the bottom of the rail 6.

The foregoing is old and constitutes a part of the invention only insofar as it co-acts with the novel features now to be set forth.

*Partial carriage return*

The Foothorap Patent 1,904,127, provides no means to effect the partial return of the carriage from any advanced position to any one of two or more precedent positions selected at the will of the operator.

The present invention not only provides this additional function, but also embodies improvements on the former mechanism, to effect a more satisfactory operation of the machine, as well as to extend its field of usefulness.

Furthermore, the present invention arranges for the automatic operation of the line spacing mechanism, not only when the carriage returns to its left hand marginal position, as in the prior patent, but also when returning the carriage from an advanced position to any of its precedent positions.

In carrying out this invention according to the embodiment herein illustrated, two keys are mounted on the key carriage 9 in place of the single key heretofore provided, it being possible to locate the carriage in three different positions under control of but two keys, as will hereinafter appear.

These keys control a carriage stop, common to both keys, which stop co-acts with one or another of a plurality of intermediate stops or abutments adjustably mounted on the usual draw bar of the automatic line spacing mechanism, at various points along the return travel of the carriage.

The line spacing mechanism distinguishes from Patent 1,904,127 in that it includes a slide, having means to releasably actuate the line spacing pawl, and bearing a stop arranged to collide with a stationary part of the frame, and accurately arrest the carriage in any position to which it may be returned, after the carriage has driven the line space draw bar a sufficient distance to actuate the line space mechanism.

The mechanism is also so arranged that the spacing between lines, and hence the extent of travel of the line space draw bar may be varied without interfering with the arrest of the carriage on its return to any selected position.

Referring to the drawings (Figs. 1–4), the keys 100, 101 controlling the return under power of the carriage from any advanced position to a selected precedent position, are mounted on the travelling key carriage 9 and arranged in a novel manner to enable the selection of any one of several precedent positions to which the carriage may return, by mechanism involving a relatively small number of parts.

To this and other ends, the key lever 100 conveniently extends along the left side wall of the carriage, being pivoted at 102 near its rear end to the rear edge of the carriage frame.

This key lever 100 extends forwardly to a point adjacent the keyboard of the key carriage, the forward end of the lever taking a downward slope corresponding generally with the angle of the keyboard, and terminating in an upwardly projecting stem extending through a slot 103 in a guide plate 104 secured to the inclined keyboard frame, the stem having a horn 100ª to limit the extent of depression of the key.

A bell crank 105 also conveniently pivoted by one arm concentrically with the key lever 100, at 102, depends from its pivot point, the depending arm constituting a support for an extension 106 adjustably secured, as by a pin and slot connection 107 and a pivot 108 spaced therefrom, to the depending arm, the extension projection below the depending arm of the bell crank 105, and being slotted, as at 109, to embrace a stud 110 on a radial arm 111 fast on a horizontal shaft 112 journaled in bearings 113 (Fig. 11), mounted on the upper face of the apron 38. The horizontal shaft 112 extends part way towards the right hand side of the key carriage and at its inner end, carries a claw 114 depending through a slot in the apron 38 to a point in proximity to and behind the trip bail 55.

The remaining shorter arm of the bell crank 105 projects forwardly substantially parallel with and below the key lever 100, the free end of the short arm having a lip 115 formed thereon to normally contact a rigid, headed pin 116 projecting from the left side of the key carriage 9, which arrests the parts at one extreme of their movement.

A restoring spring 117 (Fig. 11), encircling the shaft 112, yieldingly retains the claw 114 withdrawn from the trip bail 55, the headed pin 116 serving to limit the clockwise rotation (Figs. 2, 3 and 4) of these parts under the influence of the spring 117, and to confine the parts against lateral displacement.

A by-pass pawl 118 pivoted at 119 intermediate between the ends of, and depending from the key lever 100, is drawn clockwise (Figs. 2, 3 and 4) by a spring 120 until its free reduced end is arrested by contact with the fixed pin 116, in such position as to lie in line with the lip 115 on the short arm of the bell crank 105, as shown in Fig. 2.

The key lever 100, when depressed, forces the reduced end of the by-pass pawl 118 against the lip 115 of the short arm of the bell crank 105, and rocks the bell crank clockwise (Figs. 2-4), which, in turn, through arm 111 and shaft 112, rocks the claw 114 counter-clockwise against the trip bail 55, to close the clutch 42, 43, and the motor circuit switch 61, whereupon the motor is energized to return the carriage towards the beginning of a line.

Depression of the key lever 100 to its fullest extent (Fig. 4), brings the abruptly inclined edge 118ª of the by-pass pawl into wiping contact with the limit pin 116, which operates to cam the by-pass pawl off of the lip 115, whereupon the spring 117 restores the claw 114, shaft 112, radial arm 111 and bell crank 105 to their normal positions, irrespective of, and uncontrolled by, the key lever 100.

To enable the key lever 100 to arrest the return of the carriage according to a predetermined, though adjustable precedent position, short of a complete return to the left hand marginal position, there is provided the second key lever 101 having a vertical stem projecting sufficiently above the stem of the key lever 100 and adjacent thereto, to permit ready selection of either key by the operator.

Near the base of the stem, the key lever 101 is vertically slotted, as at 126, see Fig. 14 to accommodate the shank of a screw stud 127 projecting from the key lever 100.

A return spring 128 connected near the lower end of the key lever 101, yieldingly presses the lower wall of the slot 126 upwardly against the shank of the stud 127, or against an adjusting eccentric 129 interposed between the key levers 100, 101, and through which the screw shank 127 passes, the eccentric being frictionally clamped in adjusted position between the head of the screw and the side of the key lever 100, and adjustable by manipulating a knurled disk 125 fast with the eccentric after loosening the clamping screw stud 127.

The key lever 101 angles downwardly and rearwardly across the left hand end of the key carriage 9, its free lower end extending behind a guide plate 130 secured at its rear edge to the outer face of an abutment 131 depending a predetermined distance below the left hand lower corner of the key carriage 9.

The inner face of the guide plate 130 is vertically grooved, as indicated by dotted lines in Figs. 3 and 4, and shown in Figs. 1 and 11, to slidingly accommodate a check stop 132 fast on the lower end of the key lever 101, which check stop is normally held raised to its idle position by the spring 128.

A draft rod 133, somewhat similar to that shown at 108 in Foothorap, 1,904,127, extends transversely of the line space frame 7, the rod being T-shaped in cross section, and sliding in a channel formed by the front face of the rear rail 6 of the line space frame, the web 134 projecting forwardly therefrom, and the rear face of the carriage escapement rack 135 fastened to the outer edge of the web (see Figs. 2-4).

Figure 5:
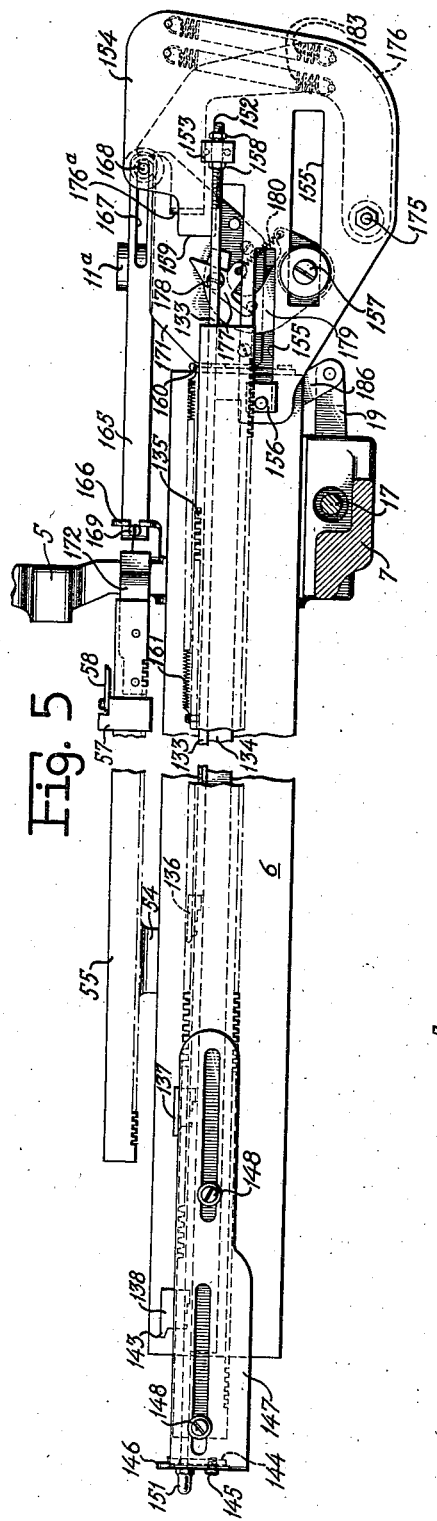
Fig. 5 is a detail front view of the line spacing slide assembly, and connected parts, at rest.

The left hand end of the draft rod 133 is toothed for a considerable portion (see Figs. 1, 5 and 8), arresters 136, 137 and 138 of different heights being adjustably arranged on the draft rod, with which the abutment 131 and the check stop 132 may co-act to arrest the carriage on its return, at any of several precedent positions, and also to effect a line spacing operation incident to its return to any such precedent position.

Preferably, the arrester 136 of least height is located farthest to the right, the arresters 137 and 138 of successively greater heights being mounted on the draft rod in corresponding order to the left of the arrester 136.

As shown in Fig. 10, these adjustable arresters are of simple yet effective construction, to enable them to be readily adjusted to the desired positions along the draft rod, and yet form an absolute locking engagement therewith against relative movement, when the carriage abutment 131 or the check stop 132 collides therewith.

To these ends, each arrester includes stepped gripping arms 139 depending from opposite sides of the right hand end of the block-like body-portion, the inner faces of which gripping arms are grooved to provide inturned shoes 140 taking under the shoulders of the T-shaped draft rod 133.

The left hand ends of the shoes are slightly reduced, as shown, to enable a slight up-and-down rocking movement of the arrester on the draft rod, and a broad tooth 141 arranged transversely of the under face of the body portion of the arrester at its left hand end, enters one or another of the interdental spaces of the rack portion of the draft rod 133. Also this under face is longitudinally recessed to accommodate the inner end of a leaf spring 142 fastened therein and projecting beyond the abrupt right hand end or contact face of the arrester, the free end of the spring being bent to ride over the teeth of the rack, and yieldingly maintain the arrester rocked to its counter-clockwise limit of movement, whereby to hold the tooth 141 engaged with the rack on the draft rod.

The tooth 141 is of less depth than the depending gripping arms 139.

A lip 143 projecting leftwardly from the body portion of the arrester and overhanging the toothed draft rod 133, enables the operator to insert his finger nail beneath the lip to tilt the arrester in clockwise direction, to release the tooth 141 from the rack teeth on the draft rod, after which the arrester may be slid in either direction, for adjustment.

The stepped formation of the gripping arms gives additional strength thereto.

The left hand end of the draft rod 133 enters a rectangular aperture formed in a clip 144 (shown in full and dotted lines in Fig. 10) adjustably fastened by a headed screw 145 to a rearwardly turned slotted ear 146 on the left hand end of a slide 147 extending towards the right along the front face of the carriage escapement rack 135 with which the slide is connected by slots and headed fastenings 148.

A threaded tang 149 projecting from the left hand end of the draft rod 133 passes through the slot 150 in the ear 146 and is secured thereto by a box nut 151 for simultaneous movement, the slide 147 operating to guide the draft rod in its endwise travel, and prevent it from canting in its channel, and thus displacing the arresters 136, 137, 138.

A similar threaded tang 152 projects from the right hand end of the draft rod through an ear 153 protruding from the face of an arresting plate 154 provided with parallel slots 155 through which pass a headed fastening 156 and a stub shaft 157, to support and guide the plate.

The stub shaft 157 is journaled in a casting 11a (Fig. 1), on which the usual spring drum 11 is mounted, and will be hereinafter referred to in connection with the automatic line spacing mechanism.

Nuts 158 carried by the tang 152 and located on opposite sides of the ear 153, permit a fine adjustment between the draft rod and arresting plate 154.

A beak 159 projects towards the left, from the upper left hand edge of the arresting plate 154 in position to collide with a forwardly extending fixed stop 160 (Fig. 1), rigidly secured to the right hand end of the rear rail 6.

A spring 161 anchored at one end to the fixed stop and connected at its opposite end to the draft rod 133, yieldingly retains the arresting plate 154, the draft rod 133, and the slide 147 at their right hand limits of travel as determined by contact of the left end wall of one of the slots 155 in the arresting plate 154 with its guiding and supporting stud 156.

Depression and immediate or quick release of either key lever 100 or 101 (Figs. 2-4), which will be hereinafter referred to as the depression of these keys, with a staccato touch, rocks the by-pass pawl 118 downwardly, the pawl, in turn, rocking the bell crank 105 and its extension rearwardly, until the pawl is cammed off the lip 115 of the forward arm of the bell crank, whereupon the operator can exercise no further control of the bell crank and the parts operated thereby.

Such rearward rocking of the bell crank is sufficient, however, to rock the radial arm 111, shaft 112 and claw 114 to swing the tripping bail 55 forwardly, which, as heretofore explained, closes the normally open clutch 42, 43, and, if necessary, closes the circuit through the motor 30 (Fig. 11), whereupon the carriage return pinion 40 is rotated to return the carriage 9 towards the left hand margin.

Because of the stud connection 127 and eccentric 129 (Figs. 1 and 14), between the two key levers 100 and 101, the key lever 100, on its depression causes the eccentric to carry with it the key lever 101, tensioning the return spring 128 and projecting the check stop 132 below the abutment 131, to one of its effective positions, but since the present operation under discussion was initiated by a staccato depression of the key lever 100, wherein the operator removes his finger from the key as soon as the latter reaches its limit of depression, there is no resistance to the action of the tensioned spring 128, which therefore, immediately returns the key levers 101 and 100 to their normal positions, thereby withdrawing the check stop 132 from the effective position to which it has been set by the key lever 100.

The tripping bail 55, however, remains in its tripped position (see Fig. 4), due to the position of the lateral lip 47 on the arm 46 beneath the free end of the hooked latch 48, which blocks the return of the latch and its thereto connected bail, the spring 53 by its pull upon the latch 48 and the tripped arm 46, operating to maintain frictionally the parts in their tripped positions against accidental displacement. As the carriage 9 continues on its return travel, the fixed abutment 131 will pass over the graduated arresters 136 and 137, and finally collide with the highest arrester 138, the location of which on the draft rod, determines the beginning of a line of writing.

The abutment 131, upon contact with the abrupt right hand face of the arrester 138, forces the arrester to the left, and with it the draft rod 133 and arresting plate 154, tensioning the return spring 161, until the beak 159 impinges against the fixed stop 160 which positively arrests farther travel of the draft rod 133 and the arrester 138 leftwardly, and hence arrests the carriage 9 in its predetermined extreme leftward position to define the left hand margin and the beginning of the writing line.

A slight play is arranged between the right hand end of the draft rod and the ear 153, to enable the escapement to lock the carriage at a uniform point upon each return of the carriage.

Obviously, it is necessary to arrange that the power shall be disconnected from the carriage as the latter is about to be arrested by contact of the beak 159 on the arresting plate with its fixed stop 160 on the line space carriage 7, which will be explained a little later.

A staccato depression of key 101 will effect the same result, the upper end wall of the slot 126 of the key lever 101 upon depression of such key, operating to pick up the eccentric 129, stud 127 and key lever 100, to shift the trip bail 55 forwardly, temporarily position the check stop 132, and tension spring 128 which, upon release of pressure upon the key lever 101, will return both key levers and the check stop to their normal idle positions.

The key levers 100, 101 enable the operator to select the desired arrester 136 or 137 which, in turn, determines the precedent position short of the left hand margin, to which the carriage may be returned from any position in advance thereof.

And to enable such selection, the check stop 132 common to both key levers 100, 101 is arranged to have two effective positions, one below the other, depending upon which of the two key levers 100, 101 is depressed and held in depressed position during the carriage return.

This variation in the extent of movement imparted to the check stop 132 is effected by the provision of the slot 126 and connection 129 between the key levers 100, 101 which results in affording one key lever (in this instance, key lever 101) a greater extent of travel than the other.

Because of this connection a single stop member on one of the keys, as the horn 100ª, suffices to arrest both keys, as both are operated regardless of which one is pressed by the operator, but the provision of the slot 126 enables one of such key levers when depressed by the operator, to obtain a lead over the remaining key lever before the latter is picked up, and hence, the check stop 132 is depressed to a greater extent by the slotted key lever than by that key lever which supports the connection 127.

The purpose of the eccentric adjustment 129, 125 is to enable the adjustment, within limits, of the extent of depression of the check stop by either key lever, so as to enable the check stop, when depressed to the uppermost of its two effective positions by key 100, to clear the lowest arrester 136, and collide with the next higher arrester 137.

To render the key lever 101 susceptible of adjustment by the eccentric 129, the key lever is afforded a floating support by the spring 128, and is guided by the plate 130 and the eccentric 129.

Assuming that the operator wishes to arrest the carriage on its return to a precedent position short of the left hand marginal position, the intermediate arrester 137 will be adjusted along the draft rod 133 to a distance in advance of the desired point of arrest substantially equivalent to the distance normally obtaining between the beak 159 and the fixed stop 160.

After the carriage 9, in its letter spacing travel has advanced to any position beyond that to which it is desired to return the carriage, and the operator desires to return the carriage to such precedent position, short of a full return, he will depress the key 100, but instead of immediately relieving the pressure thereon, upon contact of the horn 100ª with the guide plate 104, he will maintain the key depressed, and hence maintain the check stop 132 protruded to the uppermost of its effective positions below the lower edge of the abutment 131.

The key lever, upon depression, will have rocked the trip bail 55 to operatively connect the motor with the carriage, just as heretofore explained, and the carriage will start its return, the operator maintaining his finger on the key lever 100 during such return and while the check stop 132 collides with the intermediate arrester 137, and carries the latter and the draft rod with it in its leftward travel until the beak 159 on the arrester plate 154 strikes the fixed stop 160 and is thereby positively prevented from farther leftward movement.

The operation of returning the carriage to a precedent position in advance of the intermediate position determined by arrester 137, is substantially the same as that just explained, with this difference, that the operator depresses the key lever 101, as shown in Fig. 3 (wherein the depression stroke has not been quite completed), the key lever having moved from the position shown in Fig. 2 to a position wherein the upper end of the slot 126 picks up the eccentric 129 and stud 127, relatively to the key lever 100, and imparts a lead to the check stop 132 equivalent to the extent of such relative movement.

Thereafter the two key levers move together, but the preliminary lead referred to, enables the check stop to descend to its lowermost effective position, wherein, during the carriage return, it will collide with the lowest arrester 136 and effect an earlier arrest of the carriage on its return than when the key lever 100 is depressed, or when either key lever is given a staccato or tapping blow.

The disconnection of the motor and carriage is automatically effected, regardless of the extent of return travel of the carriage, by a single mechanism adapted to function upon the arrest of the carriage at any of its complete or partially returned stations.

To this end, and referring particularly to Figs. 1, 5, 6, 8 and 9, a trip bail restoring member, in the form of a floating thrust bar 165, is slidingly supported near its left hand end (Figs. 1, 5, 8 and 9), in an eye 166 projecting from the adjacent vertical bracket 5 on the line space frame 7, the thrust bar being slotted at its right hand end, as at 167, to ride on the rear end of a stud 168 projecting rearwardly from, and traveling with the arresting plate 154.

A projection 169 may be placed on the end of the thrust bar 165 adjacent the eye, to prevent accidental disengagement, and a grooved roll 170 is mounted on the supporting stud 168 to ride upon the upper edge of a rigid guide plate 171 projecting upwardly from the line space frame 7 to which it is fastened.

An inclined tappet 172 extends from the right hand end of the trip bail 55 into the path of travel of the thrust bar 165.

The length of the slot 167 in the thrust bar is less than the distance normally between the beak 159 and the fixed stop 160. Therefore, as the arresting plate 154 is drawn leftward, by contact of the abutment 131 with its arrester 138, or by contact of the check stop 132 with either of the arresters 136 or 137, the outer end of the supporting stud 168 will travel idly along the slot 167 of the thrust bar 165 until just prior to the arrest of the plate 154 by contact of its beak 159 with the fixed stop 160, the supporting stud 168 reaches the left hand end wall of the slot 167, whereupon continued movement of the arresting plate 154 shifts the left hand end of the thrust bar 165 against the tappet 172 on the trip bail 55, and rocks the trip bail back to its normal position, thereby disconnecting the shiftable driven clutch member 42 from the driving clutch member 43, and, (if required) interrupting the motor circuit, in well-known manner.

The length of the slot 167 contrasted with the extent of movement of the arresting plate 154 is so arranged that the thrust bar effects the disconnection of the motor and carriage in timed relation with the arrest of the plate 154 by its fixed stop 160, and just prior to such arrest.

Obviously, at the completion of the return of the carriage to any of its precedent positions, as determined by the key-operated check stop 132, and the arresters 136 and 137 with which it coacts, release of the key depressed enables the spring 128 (Figs. 2–4), to restore the keys 100, 101 and check stop to their normal positions, whereupon the draft rod 133 is freed to the action of the spring 161 (Fig. 1), which returns the draft rod 133, slide 147, arrester plate 154 and thrust bar 165 to their normal positions.

When the carriage is returned to its left hand marginal position, the abutment 131 maintains its engagement with the arrester 138, and hence retains the draft rod, slide, arrester plate and thrust bar in their operated positions. As the carriage advances in letter spacing direction, the spring 161 causes the draft rod and co-acting parts to advance with the carriage until they reach their normal idle positions.

*Automatic line spacing*

It is desirable that a line spacing of the carriage 9 occur each time the carriage is returned automatically towards its left hand margin.

An automatic line spacing operation is provided in Foothorap Patent 1,904,127, on which the present invention is based, each time the carriage is power-driven to the beginning of a line, but in such patent, the line spacing mechanism is locked in its actuated position until the carriage is advanced in letter-spacing direction, for instance, subsequently to the line spacing operation.

The present invention retains the advantages of the patented structure without locking the line space mechanism in its fully operated position.

To this end, there is pivotally mounted at 175 (Figs. 1, 5, 8 and 9), on the rear face of the arresting plate 154, a driver 176, of uncinate or hook-shaped form, the upper free end of which driver is laterally bent, as at 176a, to strike the nose of a flexible dog 177 pivoted at 178 near the free end of a re-entrant arm 179 fast on the stub shaft 157, which shaft, as heretofore explained, projects through one of the slots 155 of the arresting plate 154, to guide and support the plate. A spring 180 (Fig. 9), normally holds the tail 181 of the flexible dog 177, against a stud 182, so that the nose of the dog extends past the re-entrant arm 179 into the path of the free end of the hooked driver 176.

Springs 183 superior to the springs 180 and 25 (Fig. 7), normally hold the driver at one limit of its travel (Fig. 5), wherein a shoulder 184 on the driver is pressed, conveniently, against the hub of the grooved wheel 170.

A short arm 185 (Fig. 6), fast on the inner end of the stub shaft 157 has an adjustable connection with a longer arm 185a loose on the inner end of the stub shaft, a link 186 pivotally connecting the longer arm 186a with an extension of the arm 19 on the manual line spacing shaft 17 heretofore mentioned.

When the carriage 9, on its return travel, picks up the draft rod 133 and arresting plate 154 to shift them to the left, thed river 176 borne by the arresting plate, is carried therewith, until its laterally turned free end 176a collides with the nose of the flexible dog 177, applying pressure thereto, and to the re-entrant arm 179 to rock the latter counter-clockwise (Figs. 1, 5 and 8), against the tension of the springs 25, to operate the line space pawl and pawl carrier 14 and 16 in the manner hereinbefore explained.

As considerable frictional resistance may oppose this counter-clockwise rocking of the arm 179, the springs 183 are provided to cushion the shock of contact of the driver 176 and dog 177, under which condition, the springs 183 may yield somewhat and be further tensioned, thus reinforcing the pressure of the driver against the dog, to overcome the resistance, as a result of which the line spacing lever 21 with its pawl 14 and pawl carrier 16 are advanced until the foot 27 of the pawl 14 locks between the line space ratchet 13 and the projecting stud 26.

This locking action, as heretofore stated, serves as a brake to prevent overthrow of the line space frame and key carriage beyond the desired line to which they have been advanced.

The positions of the re-entrant arm 179 and the pawl carrier 16 are so related that by the time the pawl carrier and its pawl are arrested by the stud 26, the driver 176 has rocked the re-entrant arm 179 and the flexible dog so far in counter-clockwise direction as to enable the laterally turned lip 176a of the driver to escape past the flexible dog, during the final movement of the draft rod 133 and arresting plate 154 to the left.

Immediately upon the disengagement of the flexible dog 177 from the driver 179, the tensioned springs 25 restore the pawl-carrier 16, pawl 14 and actuator 21 to their normal idle positions, the rear edge of the pawl striking the adjustable back-stop 28, which contact rocks the pawl on its pivot 15, out of engagement with its ratchet 13.

Also upon the release of the depressed key 100 or 101, which frees the spring 128 to withdraw the check stop 132 from the path of the intermediate arresters 136 and 137, the spring 161 returns the draft rod 133, with its arresters 136, 137, 138 and arresting plate 154 to their normal positions, the springs 183 having restored the driver 176 to its normal position with its shoulder 176a against the hub of the guide wheel 170 at the moment the lip of the driver escaped past the nose of the flexible dog 177.

Obviously, return of the line space pawl and its associated parts, restored the re-entrant arm 179 and its dog 177 to their normal positions, so that the nose of the dog lies in the return path of the lip 176a of the driver 176. As the draft rod 133 and arresting plate 154 return to normal, the lip 176a of the driver 176 contacts and idly rocks the flexible dog, which thereafter returns to effective position under the influence of its spring 180.

Though not contemplated as a regular operation, failure of the operator to relieve pressure on the keys 100 or 101, will merely result in maintaining the carriage stop 132 in the path of return of its corresponding arrester 136 or 137, and delay the return of the draft rod 133, arresting plate 154 and thrust bar 165 to their normal right hand positions, the tensioned return spring 161 operating to cause the arrester 136 or 137 to follow the protruded stop 132 and return the parts step by step, as the carriage advances in letter spacing direction until the parts mentioned reach their right hand limits of travel.

The provision of the by-pass pawl connection 118 between the keys 100 and 101 and the clutch tripping bail 55, and the location of the flexible dog 177 between the line space pawl driver 176 and the line space pawl carrier 16, renders such continued depression of the keys 100 and 101 ineffective to interfere with the proper operation of the machine.

*Interlock to prevent simultaneous operation of the line space feed, and travel of the line space frame*

Reference has been made earlier in the specification, to the knee-operated means (Fig. 11), for shifting the shaft 70 axially in either direction from its normal centered position to set the mechanism for bodily advancing or retiring the line space frame and carriage.

To frustrate any attempt on the part of the operator to effect the actuation of the line space frame through the axially movable shaft corresponding to the shaft 70 of the present application during the return of the carriage and particularly during the line spacing operation which occurs while the carriage is executing the last part of its return movement, the patent to Foothorap, 1,904,127, discloses (Figs. 7, 11, 16–18 and 65 of that patent), a locking arm fast on the clutch shifting shaft, which arm co-acts with a grooved collar on the axially shiftable shaft to prevent effective operation of the clutch shifting shaft when the axially shiftable shaft has been brought to one or the other of its limits of axial travel, and vice versa.

In the present improvement, the former arrangement is modified to enable the clutch control bail 55 to wholly control the interlock.

To this end, a short arm 190 fast on the clutch control shaft 45 is slotted, as at 191, to embrace a lateral pin 192 on a long arm 193 loose on the clutch control shaft adjacent and parallel with the shorter arm 190. A spring 194 connects the two arms, and the free end of the longer arm normally overhangs a peripheral groove 195 (Fig. 11), formed in a collar 196 fast on the axially shiftable shaft 70.

Operation of the clutch control shaft 45 by the clutch control bail 55 and spring link 53, as heretofore explained, in initiating a power-driven carriage return, rocks the shorter arm 190 counter-clockwise (as viewed in Fig. 11), to press the lower edge of the loose arm 193 into the peripheral groove 195 of the collar, and thus lock the shiftable shaft 70 against axial movement in either direction.

Return of the clutch control bail 55 to normal by the thrust bar 165, as heretofore explained, restores the clutch shifting shaft 45 and arm 190 to their normal positions, the spring link 194 raising the loose locking arm 193 out of the groove 195 in the collar 196.

The advantage of the present structure over the prior structure is as follows:

If, prior to the withdrawal of the arm 193 from the groove 195, an attempt is made to shift the shaft 70 axially, one or the other wall of the groove will contact the arm 193 and by friction, retain the arm in locking position, (Fig. 13), while permitting the shorter arm 190 to return to normal, until axial stress on the shaft 70 is relieved.

In other words, by providing a sectional interlocking arm, one section 190 of which is in train with the clutch control bail 55, the other section 193 being capable of movement independently of the first-named section, very little resistance is opposed to the return of the tripped bail to normal position, and hence, very little opposition to the disconnecting of the clutch members 42, 43, or the interruption of the motor circuit, if a make and break switch is provided.

Thus attempts to shift the axially movable shaft 70 prematurely are blocked, without interfering with the interruption of power to the carriage upon the return of the latter to any selected point.

Also, the line space mechanism, which, as will be remembered, locks the line space frame 6, 7, 8 against movement relatively to the side rails 2, at the end of the line spacing operation, is afforded time to release its locking action, before the line space frame is shifted.

Changes may be made in the form and arrangement of the several parts described and certain features may be used or omitted, without departing from the spirit and scope of this invention.

What is claimed as new is:

1. In a writing machine, the combination with a platen element, and a keyboard element, relatively movable in letter spacing direction; a motor; and connections, including a normally disconnected clutch mechanism, between the motor and the movable element, to return the movable element in a contra-letter spacing direction; of a shiftable control rod; a plurality of arresters adjustably mounted on the rod to arrest the return movement of the movable element with the movable element in different positions; devices on the movable element respectively constructed and arranged to render the clutch mechanism effective, and to contact selectively with said arresters to shift the rod; means to limit the extent of travel of the rod; and means operated by the rod to disconnect the clutch mechanism upon contact of one of said devices with a selected arrester.

2. In a writing machine, the combination with a platen element, and a keyboard element, one of which is shiftable relatively to the other in letter spacing direction; a motor; and connections, including a normally disconnected clutch mechanism, between the motor and the movable element, to return the movable element in contra-letter spacing direction; of a control rod for the clutch mechanism, shiftable between predetermined limits on one of said elements; a series of arresters of graduated heights, adjustable along and spaced apart upon the control rod; a stop shiftable to various extents from a predetermined position on the other of said elements to coact with one or another of the arresters to arrest the relative return movements of the platen and keyboard elements; and manipulative means to impart varying extents of travel to the stop, to select a desired arrester.

3. In a writing machine, the combination with a frame element; a carriage element shiftable thereon in letter spacing direction and return; a motor; and normally disengaged connections between the motor and the carriage element to enable the motor to return the carriage element in contra-letter spacing direction; of means operable to engage and disengage such connections to effect selectively a partial or a complete return of the carriage element towards the beginning of a line and to arrest the carriage element in the desired position, including selective manipulative means; a stop mounted on one of said elements and protrudable to graduated extents from a predetermined position under control of the selective manipulative means; a draft rod mounted on the other of said elements and having a uniform extent of travel; and arresters adjustable along the draft rod and graduated in accordance with the graduated extents of protrusion of the stop, for selective coaction therewith.

4. In a writing machine, the combination with a frame; a carriage shiftable thereon in letter spacing direction and return; a motor; and normally disengaged connections between the motor and the carriage to enable the motor to return the carriage in contra-letter spacing direction; of means operable to engage and disengage such connections to effect selectively a partial or a complete return of the carriage towards the beginning of a line and to arrest the carriage in the desired position, including selective manipulative means traveling with the carriage; a stop also traveling with the carriage and protrudable to graduated extents from retracted position under control of the selective manipulative means; a draft rod supported on the frame and having a uniform extent of travel; and arresters adjustable along the draft rod and graduated in accordance with the graduated extents of protrusion of the stop, for selective coaction therewith.

5. In a writing machine, the combination of a frame; a carriage shiftable thereon in letter spacing direction and return; a motor; normally disengaged connections between the motor and the carriage to enable the motor to return the carriage in contra-letter spacing direction; and means operable to engage and disengage such connections to effect selectively a partial or a complete return of the carriage towards the beginning of a line and to arrest the carriage in the desired position, including a plurality of selective manipulative means; a single stop mounted on the carriage, normally held in retracted position and protrudable to different extents from such position under control of one or another of the manipulative means; an arresting plate supported on the frame and having a uniform extent of travel; a fixed stop to limit the travel of the arresting plate in one direction, the arresting plate normally lying at its opposite limit of travel; a draft member connected to the arresting plate, and extending adjacent to the path of travel of the carriage; and graduated arresters adjustable along the draft member and with which the protrudable stop may coact.

6. In a writing machine, the combination of a frame; a carriage shiftable thereon in letter spacing direction and return; a motor; normally disengaged connections between the motor and the carriage to enable the motor to return the carriage in contra-letter spacing direction; and means operable to engage and disengage such connections to effect selectively a partial or a complete return of the carriage towards the beginning of a line and to arrest the carriage in the desired position, including manipulative means; a stop mounted on the carriage and protrudable to different extents from a retracted position under control of the manipulative means; an arresting element supported on the frame and having a uniform extent of travel irrespective of the point to which the carriage is returned; a fixed stop to limit travel of the arresting element in one direction, and hence, the return travel of the carriage, the arresting element normally lying at the opposite end of its travel; a support connected to the arresting element, and extending along the path of travel of the carriage; arresters adjustable along the support, and with which the protrudable stop coacts; a floating thrust bar operated by the arresting element; mechanism actuated by said thrust bar to disengage said connections; and means to restore the arresting element and its connected parts to normal.

7. In a writing machine, the combination with a frame; a carriage shiftable thereon in letter spacing direction and return; a motor; and normally disengaged connections between the motor and the carriage to enable the motor to return the carriage in contra-letter spacing direction; of means operable to engage and disengage such connections to effect selectively a partial or a complete return of the carriage towards the beginning of a line and to arrest the return movement of the carriage with the carriage in the desired position, including a plurality of selective manipulative devices, connections between said devices by which any one of the devices is operable by another constructed and arranged so that one of said devices has a greater extent of travel than another; means connected with one of the manipulative devices to effect engagement of the connections between the motor and the carriage; a protrudable stop connected with another of said manipulative devices; and carriage arresting means with which the protrudable stop coacts.

8. In a writing machine, the combination with a frame; a carriage shiftable thereon in letter spacing direction and return; a motor; and normally disengaged connections between the motor and the carriage to enable the motor to return the carriage in contra-letter spacing direction; of means operable to engage and disengage such connections to effect selectively a partial or a complete return of the carriage towards the beginning of a line and to arrest the return movement of the carriage with the carriage in the desired position, including a plurality of selective manipulative devices, connections between said devices by which any one of said devices is operable by another, constructed and arranged so that one of said devices has a stroke of greater extent than another; a by-pass pawl connected with one of the manipulative devices other than that having the longer stroke; means operable by said by-pass pawl to engage the connections between the motor and carriage; a stop protrudable to different extents and connected to the manipulative device having the longer stroke; the carriage-arresting means with which the stop coacts.

9. In a writing machine, the combination of a frame; a carriage shiftable thereon in letter spacing direction and return; a motor; normally disengaged mechanical driving connections between the motor and the carriage to enable the motor to return the carriage in contra-letter spacing direction; and means operable to engage and disengage such connections to effect selectively a partial or a complete return of the carriage towards the beginning of a line and to arrest the return movement of the carriage with the carriage in the desired position, including a plurality of selective manipulative devices connected for conjoint action, connections between said devices by which one of the devices has a limited movement relatively to the other; a stop directly actuated by the first of said devices; and carriage-arresting means with which the stop coacts.

10. In a writing machine, the combination with a frame; a carriage shiftable thereon in letter spacing direction and return; a motor; and normally disengaged connections between the motor and the carriage to enable the motor to return the carriage in contra-letter spacing direction; of means operable to engage and disengage such connections to effect selectively a partial or a complete return of the carriage towards the beginning of a line and to arrest the return movement of the carriage with the carriage in the desired position, including a leverage operable to set the connections between the motor and the carriage; a plurality of selective manipulative devices connected for joint action; means operated by one of said devices for controlling the leverage; a stop adjustable to a plurality of effective positions by the respective manipulative devices; and carriage arresting means with which the stop coacts.

11. In a writing machine, the combination of a frame; a carriage shiftable thereon in letter spacing direction and return; a motor; normally disengaged connections between the motor and the carriage to enable the motor to return the carriage in contra-letter spacing direction; and means operable to engage and disengage such connections to effect selectively a partial or a complete return of the carriage towards the beginning of a line and to arrest the return movement of the carriage with the carriage in the desired position, including a leverage operable to set the drive connections between the motor and carriage; a plurality of selective manipulative devices; means operable by one of said devices for controlling transitorily the leverage; a stop adjustable to a plurality of effective positions by the respective manipulative devices; and carriage arresting means with which the stop coacts.

12. In a writing machine, the combination with a frame; a carriage shiftable thereon in letter spacing direction and return; a motor; and normally disengaged connections between the motor and the carriage to enable the motor to return the carriage in contra-letter spacing direction; of means operable to engage and disengage such connections to effect selectively a partial or a complete return of the carriage towards the beginning of a line and to arrest the carriage in the desired position, including a leverage operable to set the drive connections between the motor and carriage; a plurality of selective manipulative devices; means operable by one of said devices for controlling transitorily the leverage; a stop adjustable to a plurality of effective positions by the respective manipulative devices; and carriage-arresting means with which the stop coacts, including a plurality of arresters graduated in accordance with the several effective adjustments of the stop.

13. In a writing machine, the combination with a frame; a carriage shiftable thereon in letter spacing direction and return; a motor; and normally disengaged connections between the motor and the carriage to enable the motor to return the carriage in contra-letter spacing direction; of means operable to engage and disengage such connections to effect selectively a partial or a complete return of the carriage towards the beginning of a line and to arrest the return movement of the carriage, including a lever train operable to set the drive connections between the motor and carriage; a plurality of selective manipulative devices; a slip pawl operable by one of the manipulative devices to actuate the lever train; means to disconnect the slip pawl and the lever train, as the latter is operated, to deprive the manipulative device of further control of the lever train; means to restore the slip pawl to effective position relatively to the lever train upon return of the manipulative device to normal position; a stop adjustable to a plurality of effective positions by the respective manipulative devices; and carriage arresting means with which the stop coacts.

14. In a writing machine, the combination with a frame; a carriage shiftable thereon in letter spacing direction and return; line space mechanism associated with the carriage; a motor; normally disengaged connections between the motor and carriage, to enable the motor to return the carriage in contra-letter spacing direction; and means operable to engage and disengage such connections; of a shiftable carriage arresting means normally lying at one limit of its travel; a fixed stop contacted by the carriage arresting means at its opposite limit of travel; a stop traveling with the carriage; arresters adjustable along the carriage arresting means, and with which the traveling stop on the carriage selectively coacts to variously arrest the carriage upon its return; and means operable by, and incident to the operation of, the carriage arresting means to actuate the line spacing mechanism, including a cushioned drive member carried by the shiftable carriage arresting means; an arm connected with the line spacing mechanism; a flexible pawl carried by the arm; and means to limit movement of the flexible pawl in one direction, the cushioned drive member impinging against the pawl normally lying in its path of travel to rock the arm, during the travel of the carriage arresting means towards the fixed stop, the paths of travel of the line spacing arm and the cushioned drive member being so arranged as to enable the cushioned drive member to escape past the pawl at the completion of the line spacing operation and prior to the contact of the carriage arresting means with its fixed stop.

15. In a writing machine, the combination with a frame; a carriage shiftable thereon in letter spacing direction and return; a motor; and normally disengaged connections between the motor and carriage, to return the carriage in contra-letter spacing direction; of shiftable carriage arresting means, including spaced arresters to arrest the return of the carriage with the carriage in different positions; selectively operable means on the carriage to coact with the respective arresters to variably limit, at will, the extent of contra-letter spacing travel of the carriage and means for engaging said connections upon each operation of the selectively operable means; the extent of shift of the carriage arresting means being uniform irrespective of the extent of return of the carriage.

16. In a writing machine the combination with a frame; a carriage shiftable thereon in letter spacing direction and return; a motor; and normally disengaged connections between the motor and carriage, to return the carriage in contra-letter spacing direction; of shiftable carriage arresting means, including spaced arresters; selectively operable means on the carriage to coact with the respective arresters to variously limit, at will, the extent of contra-letter spacing travel of the carriage; the extent of shift of the carriage arresting means being uniform irrespective of the extent of return of the carriage; means to engage said connections upon the actuation of said selectively operable means and line spacing mechanism associated with the carriage, and operable by the carriage arresting means irrespective of the extent of return of the carriage.

17. In a writing machine having a frame shiftable in one direction; a carriage on the frame shiftable in a different direction; a single motor; normally idle drive trains individual to the frame and the carriage, and actuated by the motor respectively to shift the frame and carriage, one of said trains including an axially shiftable member; manually controlled means for shifting said member; and manually controlled means for controlling the other of said trains including a member movable about an axis; of an interlock to retain one drive train idle during the operation of the other drive train, including a recessed element on the axially shiftable member of one drive train, and a sectional arm on the other of said members, one element of the sectional arm being fast on the corresponding member and the remaining element being loose relatively thereto and arranged to engage in the recess in said recessed element; a flexible link to connect the fast and loose elements; and means to limit relative movement of the fast and loose elements in one direction.

18. In a carriage return mechanism for writing machines and the like; the combination with a traveling carriage; a motor; and normally disengaged connections between the motor and the carriage to return the carriage in contra-letter spacing direction; of a plurality of graduated arresters adjustably arranged in spaced relation along the path of travel of the carriage; an adjustable stop traveling with the carriage; a plurality of selective means to variably adjust the traveling stop in different active positions respectively for coaction with the several arresters; and a transitory control common to the several selective means, to enable any of the selective means to effect engagement of the connections between the motor and the carriage.

19. In a writing machine, the combination with a traveling carriage; means to advance the carriage in letter spacing direction; a motor to return the carriage towards its starting point; and normally ineffective driving means between the motor and the carriage; of a pair of arresters arranged in tandem along the path of travel of the carriage; a normally idle stop traveling with the carriage for engaging selectively said arresters; manipulative devices having a disjunctive connection with the driving means to render the latter effective, and operable to variously adjust the traveling stop into positions to engage respectively said arresters, one of the manipulative devices having a greater extent of travel than the other; and means operable as an incident to the contact of the traveling stop with either arrester, to render the driving means ineffective.

20. In a writing machine, the combination with a traveling carriage; means to advance the carriage in one direction; a motor to return the carriage; and normally ineffective drive connections between the motor and carriage; of a pair of arresters arranged in spaced relation along the path of travel of the carriage; a stop adjustable to coact with one or another of the arresters; manipulative devices, one of which is operable through a greater extent of travel than another, to variously adjust the stop to select one or another of the arresters; means controlled by the manipulative devices to render the drive connections effective; and means operable incident to contact of the stop with its selected arrester, to render the drive connections ineffective.

21. In a writing machine, the combination with a traveling carriage; means to advance the carriage in one direction; a motor to return the carriage; and normally ineffective drive connections between the motor and carriage; of a pair of arresters arranged in spaced relation along the path of travel of the carriage; a stop adjustable to coact with one or another of the arresters; manipulative devices and connections between the same by which either of the devices controls the other, one of said devices being capable of a greater extent of travel than the other, to variously set the stop to select one or another of the arresters; means operable by the manipulative devices to render the drive connections effective; and means operable as a sequence to contact of the stop with the selected arrester, to render the drive connections ineffective.

22. In a writing machine, the combination with a traveling carriage; means to advance the carriage in one direction; a motor to return the carriage; and normally ineffective drive connections between the motor and carriage; of a pair of arresters arranged in spaced relation along the path of travel of the carriage; a stop adjustable to coact with one or another of the arresters; manipulative devices, one of which has a disjunctive connection with the drive connections to render the latter effective, and another of which is connected with the stop, the manipulative devices having a slip connection, to enable that device controlling the stop to have a greater extent of travel than the other; and means operable as a result of contact of the stop with the selected arrester, to render the drive connections ineffective.

23. A record making machine having, in combination, line space mechanism, a carriage movable in letter spacing direction and return, means for moving the carriage in letter spacing direction during the typing operation, power operated mechanism for imparting return movements to the carriage, and means for stopping the return movement of the carriage in either of two different return positions and for operating the line space mechanism upon stopping the carriage in either of said positions comprising a longitudinally movable bar, selectively operable means for moving the bar longitudinally from the movement of the carriage during the latter part of the return movement of the carriage to either of said positions and mechanism for actuating the line space mechanism from the said longitudinal movements of the bar.

24. A record making machine having, in combination, a substantially flat platen, a line space frame movable over the platen to line space, a type carriage movable laterally on the line space frame, means for advancing the carriage during a typing operation, power driven mechanism for imparting return movements to the carriage, means for throwing said mechanism into operation, mechanism for stopping the carriage selectively in either of two different return positions and means rendered operative by said stopping mechanism during each carriage return operation for imparting a line spacing movement to the line space frame upon stopping the carriage in either of said return positions.

25. A record making machine having, in combination, a substantially flat platen, a line space frame movable over the platen to line space, a type carriage movable laterally on the line space frame, means for advancing the carriage during a typing operation, power driven mechanism for imparting return movements to the carriage, means for throwing said mechanism into operation, selectively controlled devices for throwing out the power mechanism at either of two predetermined points in the return movement of the carriage and stopping the carriage in either of two predetermined positions and mechanism rendered operative by said devices during each return movement of the carriage for imparting a line spacing movement to the line space frame upon stopping the carriage in either of said positions.

26. A record making machine having, in combination, line space mechanism, a carriage movable in letter spacing direction and return, means for moving the carriage in letter spacing direction during the typing operation, power operated mechanism for imparting return movements to the carriage, and means for stopping the return movement of the carriage in either of two different return positions and for operating the line space mechanism upon stopping the carriage in either of said positions comprising a longitudinally movable bar, selectively operable means for moving the bar longitudinally from the movement of the carriage during the latter part of the return movement of the carriage to either of said positions, mechanism for actuating the line space mechanism from the said longitudinal movements of the bar and means for stopping the longitudinal movement of the bar to stop the carriage.

OSCAR J. SUNDSTRAND.